US012697757B2

(12) United States Patent
Gschaider et al.

(10) Patent No.: US 12,697,757 B2
(45) Date of Patent: Aug. 4, 2026

(54) METHOD FOR MANUFACTURING AN INTERIOR COMPONENT FOR VEHICLES

(71) Applicant: Lisa Dräxlmaier GmbH, Vilsbiburg (DE)

(72) Inventors: Wolfgang Gschaider, Niederaichbach (DE); Marco Reis, Bodenkirchen (DE); Willi Butz, Andermannsdorf (DE); Franz Hubauer, Schalkham (DE); Friedrich Graf, Eggenfelden (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 33 days.

(21) Appl. No.: 18/731,939

(22) Filed: Jun. 3, 2024

(65) Prior Publication Data

US 2024/0316842 A1    Sep. 26, 2024

Related U.S. Application Data

(63) Continuation of application No. PCT/EP2022/083402, filed on Nov. 28, 2022.

(30) Foreign Application Priority Data

Dec. 3, 2021    (DE) ......................... 102021131885.8

(51) Int. Cl.
*B29C 45/14* (2006.01)
*B29L 31/00* (2006.01)

(52) U.S. Cl.
CPC .. *B29C 45/14639* (2013.01); *B29C 45/14065* (2013.01); *B29C 45/14426* (2013.01); *B29C*

*2045/14131* (2013.01); *B29C 2045/14163* (2013.01); *B29L 2031/779* (2013.01)

(58) Field of Classification Search
CPC .... B29C 45/14639; B29C 2045/14131; B29C 2045/14163

See application file for complete search history.

(56) References Cited

U.S. PATENT DOCUMENTS

| | | | | |
|---|---|---|---|---|
| 4,878,850 A | * | 11/1989 | Letemps .................. | H05B 3/84 338/322 |
| 6,024,904 A | * | 2/2000 | Nanri ....................... | H05B 3/86 264/254 |
| 6,620,365 B1 | * | 9/2003 | Odoi ................ | B29C 45/14377 264/261 |
| 9,125,247 B2 | * | 9/2015 | Li ..................... | B29C 45/14811 |

(Continued)

FOREIGN PATENT DOCUMENTS

| | | |
|---|---|---|
| DE | 102005003132 A1 | 3/2006 |
| DE | 102005026766 A1 | 12/2006 |

(Continued)

*Primary Examiner* — Edmund H Lee

(74) *Attorney, Agent, or Firm* — Burris Law, PLLC

(57) ABSTRACT

A method for the manufacturing of an interior component for vehicles includes arranging a heating element in an injection mold and injecting a plastic melt into the injection mold in order to produce a base body. The heating element is disposed on a surface of the base body. The method further includes removing of the base body with the heating element from the injection mold after the plastic melt has solidified, and applying a cladding in order to clad the heating element and at least a part of the surface of the base body.

19 Claims, 4 Drawing Sheets

(56)                    References Cited

U.S. PATENT DOCUMENTS

| 11,890,820 | B2 * | 2/2024 | Shinoda | B29C 65/645 |
| 2004/0155029 | A1 * | 8/2004 | Haag | H05B 3/18 |
| | | | | 219/543 |
| 2004/0265512 | A1 * | 12/2004 | Aengenheyster | |
| | | | | B29C 45/14811 |
| | | | | 264/261 |

FOREIGN PATENT DOCUMENTS

| DE | 102012208534 | A1 | 11/2013 |
| DE | 102013008488 | A1 | 11/2014 |
| DE | 102017008496 | A1 | 3/2019 |
| JP | H07241932 | * | 9/1995 |
| WO | WO2020126265 | * | 6/2020 |

* cited by examiner

METHOD FOR MANUFACTURING AN INTERIOR COMPONENT FOR VEHICLES

CROSS-REFERENCE TO RELATED APPLICATIONS

This application is a continuation of International Application No. PCT/EP2022/083402, filed on Nov. 28, 2022, which claims priority to and the benefit of DE 10 2021 131 885.8 filed on Dec. 3, 2021. The disclosure of each of the above-referenced applications is incorporated herein by reference.

FIELD

The present disclosure relates to a manufacturing method for an interior component for vehicles, in which the interior component is suited to heat a vehicle interior.

BACKGROUND

The statements in this section merely provide background information related to the present disclosure and may not constitute prior art.

Known are heatable interior components for vehicles which, in operation or during the use of the vehicle, are in direct contact with the driver or the passenger. These include, for example, seat heaters. In the known heatable interior components, a heating mat is disposed between a flexible base body, for example a foam core and a cladding, such as a seat cover. Due to the flexibility of the base body, during the manufacturing of such a heatable interior component, the heating mat can be easily placed on the base body without the risk of the heating mat or a line connected with the heating mat being kinked and thereby damaged.

Other interior components, such as, for example, armatures or interior claddings, generally do not have flexible base bodies. Rather, a hard, non-deformable, i.e. an inflexible base body is used. If such dimensionally stable interior components are manufactured using the known manufacturing methods, there is the risk that the heating mats will kink at the edges of the base body during the cladding process and be damaged. This leads to a high reject rate, and consequently also to major production complexity with high manufacturing costs.

In addition, such interior components are generally provided with a tight-fitting cladding, such as, for example, leather. Then the contour of the heating mat applied to the base body may be pressed through the cladding. This results in an undesirable visual appearance for the user.

SUMMARY

This section provides a general summary of the disclosure and is not a comprehensive disclosure of its full scope or all of its features.

The present disclosure provides a manufacturing method for interior components for vehicles. The present disclosure provides an improved manufacturing method for interior components that involves low manufacturing complexity. For the manufacturing of the interior component, a heating element is introduced into an injection mold. Then, a plastic melt is injected into the injection mold to produce a base body on whose surface the heating element is disposed. After the plastic melt has solidified, the base body with the heating element is removed from the injection mold. Then, a cladding is applied onto the base body covering the heating element and at least a part of the surface of the base body.

The present disclosure provides a method for the manufacturing of an interior component. The method of manufacturing the interior component for vehicles includes that at the start a heating element is disposed in an injection mold. Then a plastic melt is injected into the injection mold. The plastic melt injected into the injection mold then solidifies, in one example, by cooling and/or by a chemical reaction. A base body is thereby produced on whose surface the heating element is disposed. The heating element is, in one example, framed in the base body. The base body with the heating element is then removed from the injection mold. In the following method step, a cladding is applied to clad the heating element and at least a part of the base body. The manufacturing method results in the heating element being a component of the base body, the heating element is, in one example, embedded or framed in the base body, and may not subsequently be adapted to the shape of the base body. This has, on the one hand, the advantage that the reject rate during the manufacturing process is reduced, since electrical components may no longer be kinked at the edges of the base body, and on the other hand, that the contour of the heating element, after the cladding process, is inhibited from pressing through the cladding.

The plastic melt can be a heated rigid plastic, for example a thermoplastic plastic. For example, the plastic melt can comprise a polycarbonate and/or a polystyrene with its copolymers, such as acrylonitrile butadiene styrene. In one example, the plastic melt is comprised of a rigid plastic. The use of heated rigid plastic in the plastic melt, or as the plastic melt, has the advantage that the base body can be rigid, inflexible, and/or non-deformable, and the interior component can be used, for example, as an armature and/or as a cladding component in the interior of a vehicle.

In addition, the plastic melt can include gas cavities, in particular cavities of one or more inert gases. This has the advantage of reducing the net weight of the base body and providing heat-insulating properties.

According to one example in the manufacturing process, the injecting process is a single injection process. The injection process can occur in the one-shot method. This has the advantage of shortening the duration of the manufacturing method. In addition, a partial solidification of the plastic melt does not occur during the injection process.

In a further example of the manufacturing method, the heating element is fixated prior to the injecting of the plastic melt into the injection mold. For example, the heating element can be fixed on or in the injection mold using plugs and/or fixing holes. Alternatively or additionally, the injection mold can include plugs and/or fixing holes for the fixation of the heating element. Fixation of the heating element means that the heating element cannot slip inside the injection mold during the injecting. This has the advantage that the interior component produced by the manufacturing method can have smaller manufacturing tolerances, or the heating element can be positioned more precisely on the base body.

According to a further example, during the injection process, the first surface of the heating element is covered or sprayed with the plastic, in one example, the plastic melt. During the injection process, the second surface of the heating element, opposite the first surface, remains substantially free of plastic, in one example, free of the plastic melt. This means that a wetting of the second surface with plastic is undesired, and the wetting of the second surface with plastic is limited to the manufacturing tolerances specified for the manufacturing process.

In a further development of the above-mentioned example, after the application of the cladding, the second surface is covered by the cladding, in particular only by the cladding. For example, the cladding is applied directly onto the heating element. After the application of the cladding, the second surface of the heating element, in one example, abuts against the cladding. This has the advantage that the heat emitted by the heating element can be transmitted directly onto the cladding layer and can be emitted to a vehicle interior. The degree of effectiveness of the interior component with respect to the heating of the vehicle interior can thereby be increased.

A terminal plug for the controlling and/or power supply can be provided on the heating element. The terminal plug and the heating element are, in one example, back-injected together with the plastic melt during the injection process. This means that both the terminal plug and the heating element are at least partially covered by the plastic melt during the injection process. This has the advantage that the connection between the terminal plug and the heating element is strengthened by the base body after the solidifying of the plastic melt.

In a further example, in which the heating element includes a terminal plug, the terminal plug and the heating element can be back-injected such that the terminal plug is only partially framed by the plastic melt. This has the advantage that in the fully manufactured interior component, the terminal plug protrudes from the base body, and thus remains accessible from outside.

In a further example, the injection mold can include a hold-down device. The heating element is, in one example, held down with the hold-down device. If a terminal plug is disposed on the heating element, the hold-down device can hold down the terminal plug during the injection process. This has the advantage that the interior component produced by the manufacturing method can have low manufacturing tolerances, or the heating element can be more precisely positioned on the base body. The hold-down device can include, for example, a spring that presses the heating element, and/or the terminal plug on the heating element, against an outer wall of the injection mold.

In a further example, the heating element is connected, via a conductor element, with a terminal plug for the control means and/or power supply. The heating element and the conductor element are, in one example, back-injected or covered by the plastic melt during the injection process such that at least a part of the conductor element and of the terminal plug are not framed by the plastic melt. As a result, in the finished interior component, at least a part of the conductor element and a part of the terminal plug protrude from the interior component. This has the advantage that the terminal plug is very easily accessible from outside and can be particularly easily connected to a power and/or control-network of the vehicle in which the interior component is installed. The terminal plug can be moved by the conductor element with respect to the fully manufactured interior component.

In one example, after the applying of the cladding, the heating element and at least a part of the conductor element are disposed between the cladding and the base body. In one example, both the heating element and a part of the conductor element are framed by the base body. With large interior components this has the advantage that the heating element can be disposed spaced from a terminal location for the terminal plug without an additional, lengthened conductor element.

The heating element can be an electric panel heating means. The heating element may include one or more electric heating loops. The heating element is, in one example, a nonwoven stranded heating means, a heating film, and/or a heating fabric. This has the advantage that the heating element has a structural shape that is as flat as possible. In one example, the heating element includes a temperature sensor. The temperature sensor can be an electric thermistor, such as an NTC thermistor. A heating element with a temperature sensor has the advantage that the heating element can be better regulated, and/or an overheating of the heating element can be inhibited.

The interior component produced by the manufacturing method can be an interior component of a vehicle, such as a motor vehicle, an aircraft, and/or a ship. The interior component is, in one example, an armature or an interior trim component of a vehicle.

DRAWINGS

In order that the disclosure may be well understood, there will now be described various forms thereof, given by way of example, reference being made to the accompanying drawings, in which.

DETAILED DESCRIPTION

Figure 1:
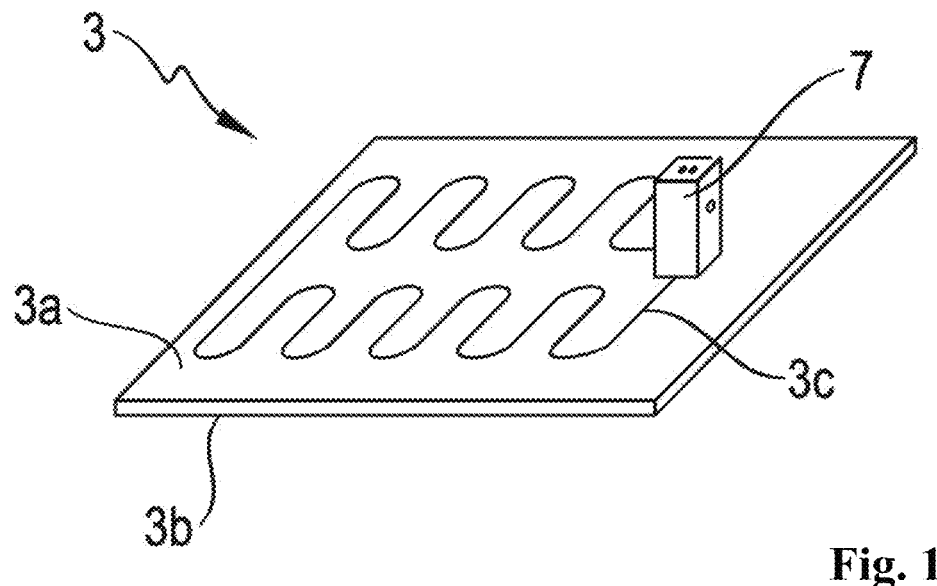
FIG. 1 shows a schematic perspective view of a heating element for a manufacturing method according to a first example of the present disclosure.

The following description is merely exemplary in nature and is not intended to limit the present disclosure, application, or uses. It should be understood that throughout the drawings, corresponding reference numerals indicate like or corresponding parts and features. The different and example features described herein can be combined with one another provided this is technically meaningful and suitable. Further features, advantages, and examples of the present disclosure arise from the following description of examples of the inventive interior-fitting part and on the basis of the figures.

FIG. 1 shows a schematic depiction of an example heating element 3, as can be used for a manufacturing method according to a first example. The heating element 3 comprises a film, a fleece, or a similarly thin base material. The heating element 3, in one example, the base material of the heating element 3, has a first surface 3*a* and a second surface 3*b*. The second surface 3*b* is disposed opposite, or opposing, the first surface 3*a* and facing away from it.

Heating braids 3*c* are disposed in or on the heating element 3, in particular in or on the base material of the heating element 3. The heating braids 3*c* are electrically contacted with a terminal plug 7. The terminal plug 7 is suitable for connection with a power supply and/or a control device.

Figure 2:
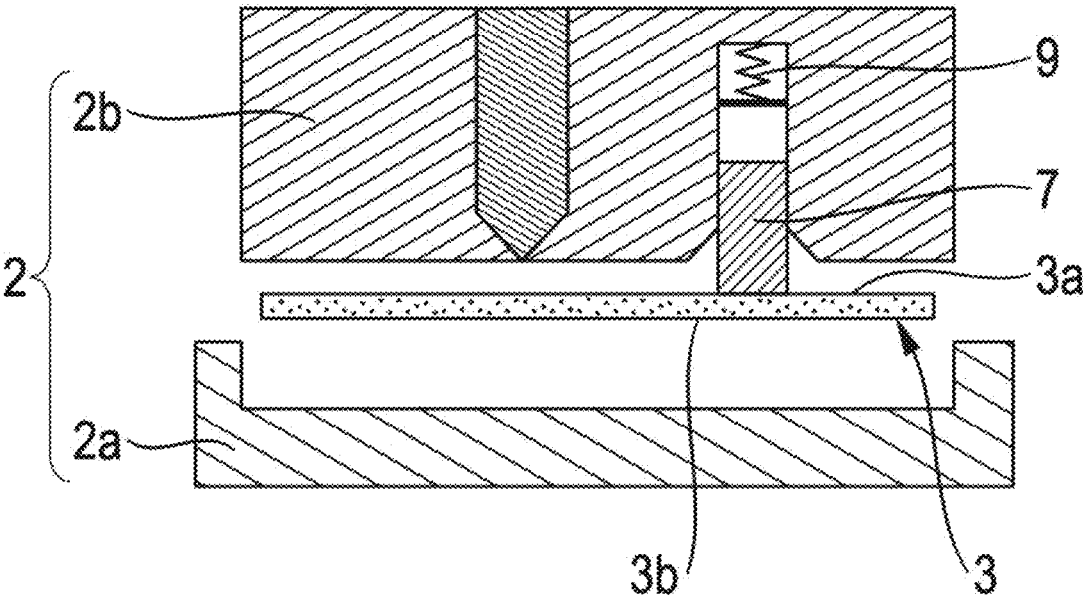
FIG. 2 shows a schematic cross-sectional view of a first method step of the manufacturing method according to the first example of the present disclosure.
Figure 3:
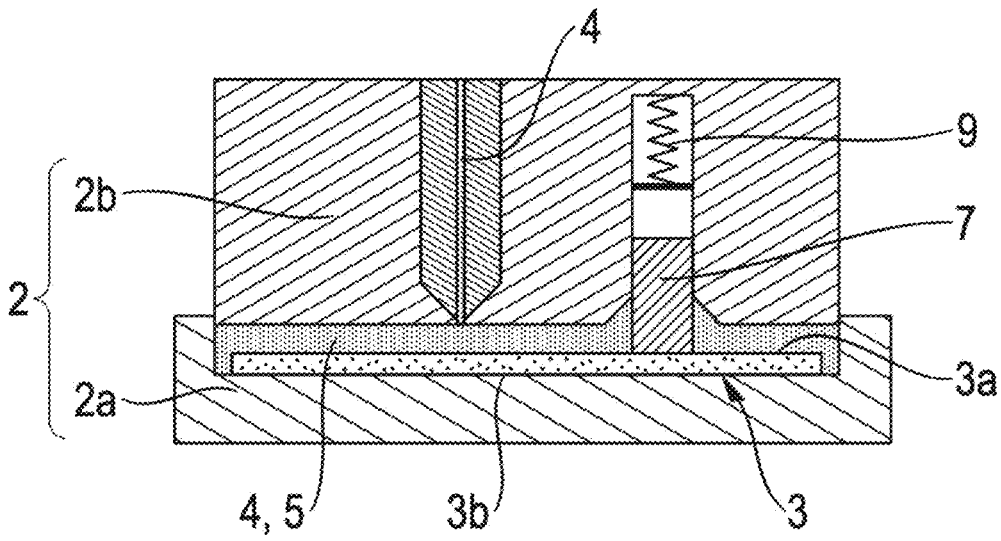
FIG. 3 shows a schematic cross-sectional view of a second method step of the manufacturing method according to the first example of the present disclosure.
Figure 4:
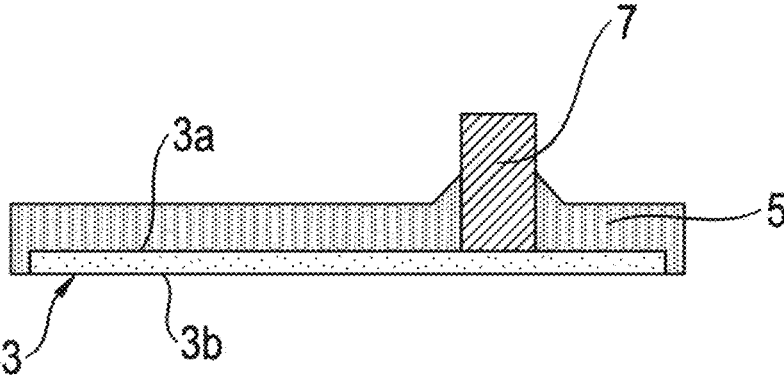
FIG. 4 shows a schematic cross-sectional view of a third method step of the manufacturing method according to the first example of the present disclosure.

FIGS. 2-4 show various method steps of the manufacturing method according to the first example in chronological sequence. FIG. 2 shows the first method step of the exemplary manufacturing method, in which the heating element 3 according to FIG. 1 is disposed in an injection mold 2. Here the second surface 3*b* of the heating element 3 is placed on a first injection-mold part 2*a* of the injection mold 2. Then a second injection-mold part 2*b* of the injection mold 2 is disposed opposite the first surface 3*a* of the heating element 3.

In the example depicted, the second injection-mold part 2*b* comprises a nozzle for a plastic melt 4 (see FIG. 3) and a hold-down device 9. The hold-down device 9 is configured to fix the terminal plug 7 during the injection process shown in FIG. 3, in particular to hold the terminal plug 7 down.

As shown in FIG. 3, the injection mold 2, in particular the first injection-mold part 2*a* and the second injection-mold part 2*b* of the injection mold 2 form a hollow space, or in one example, a cavity. The plastic melt 4 is injected into this hollow space. The plastic melt 4 can be, for example, a heated rigid plastic 4, in one example a heated thermoplastic 4. The injecting process, in one example, comprises a single injection event, so that the plastic melt 4 does not cool or cools only insignificantly during the course of the injecting.

During the injecting, the heating element 3 is disposed in the hollow space, in particular, in the cavity in which the first surface 3*a* faces the hollow space. The second surface 3*b* abuts against the first injection-mold part 2*a*. Due to the injecting of the plastic melt 4 into the hollow space, the heating element 3 is back-injected. Here the first surface 3*a* in particular is covered by the plastic melt 4. The second surface 3*b* remains substantially free of plastic melt 4.

In the example depicted, the terminal plug 7 is also partially back-injected by the plastic melt 4. The connection between the terminal plug 7 and the heating element 3 is framed by the plastic melt 4 during the injecting.

After the injecting of the plastic melt 4, the plastic melt 4 solidifies by cooling and/or by a thermal reaction. The solidified plastic melt 4 forms a base body 5. The heating element 3 is disposed on the surface of the base body 5. The heating element 3 is framed by the base body 5.

FIG. 4 shows the base body 5, the heating element 3, and the terminal plug 7, after it has been removed from the injection mold 2. The connection between the terminal plug 7 and the heating element 3 is disposed in the base body 5. The heating element 3 is framed by the base body 5. The second surface 3*b* of the heating element 3 is flush with a surface of the base body 5. The second surface 3*b* and the surface, abutting flush against it, of the base body 5 form a visible side.

Figure 5:
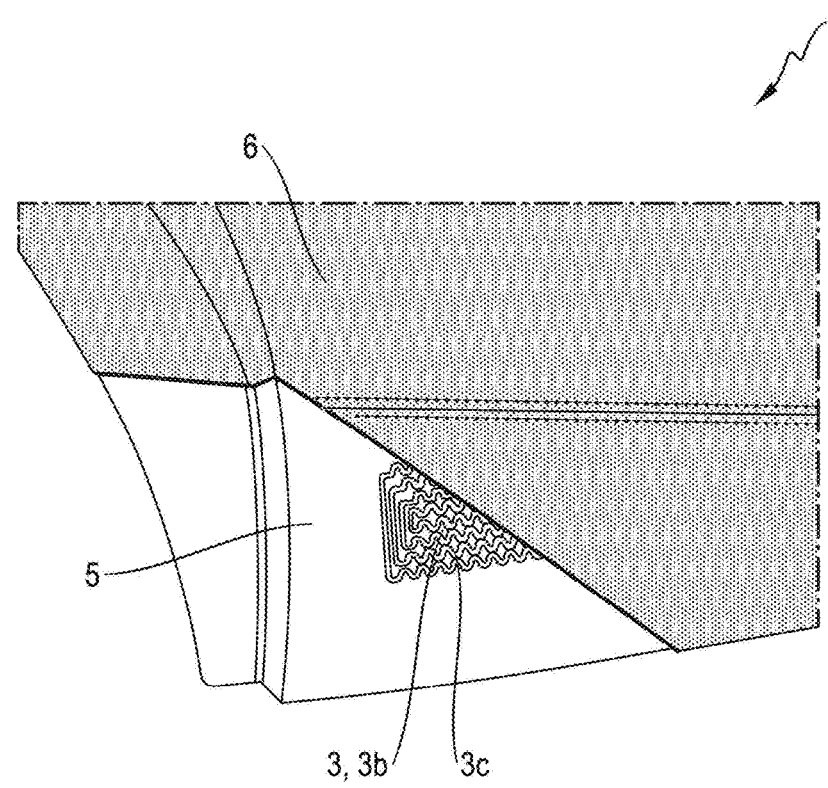
FIG. 5 shows a perspective view of an interior component according to a fourth method step of the manufacturing method according to the first example of the present disclosure.

FIG. 5 shows a fully manufactured interior component 1 in a perspective view. In order to fully manufacture the interior component 1, a cladding 6 has been applied onto the visible side in a further manufacturing step. For better understanding, a part of the cladding 6 is not shown in FIG. 5, so that at least a part of the heating element 3, in particular the second surface 3*b* and the heating braids 33, as well as a part of the base body 5 is visible.

The heating element 3 and at least a part of the surface of the base body 5 are covered or cladded by the cladding 6. The entire visible surface is, in one example, covered or cladded by the cladding 6. The second surface 3*b* of the heating element 3 abuts against the inner surface of the cladding 6 after the application of the cladding 6. In the fully manufactured interior component 1 the heating element 3 is no longer visible for a user.

Figure 6:
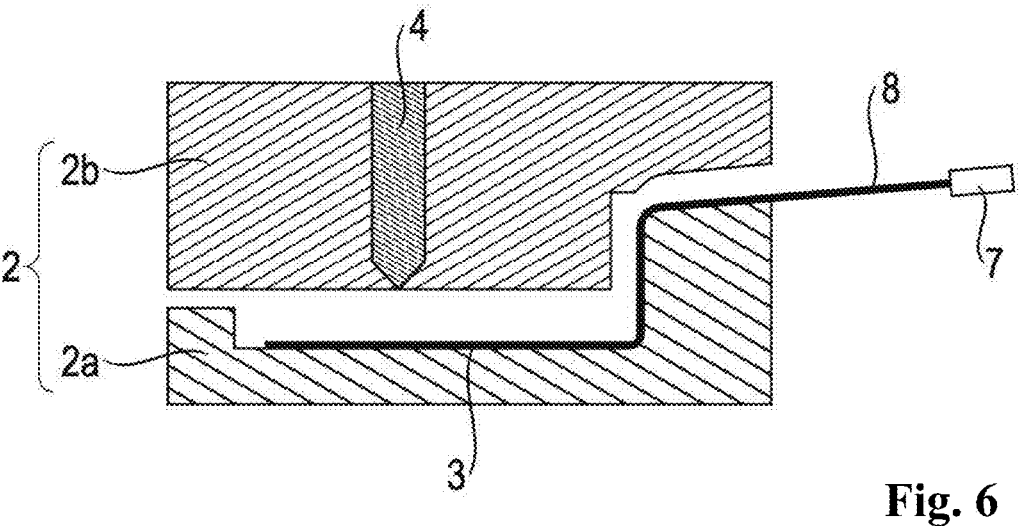
FIG. 6 shows a schematic cross-sectional view of a first method step of the manufacturing method according to a second example of the present disclosure.
Figure 7:
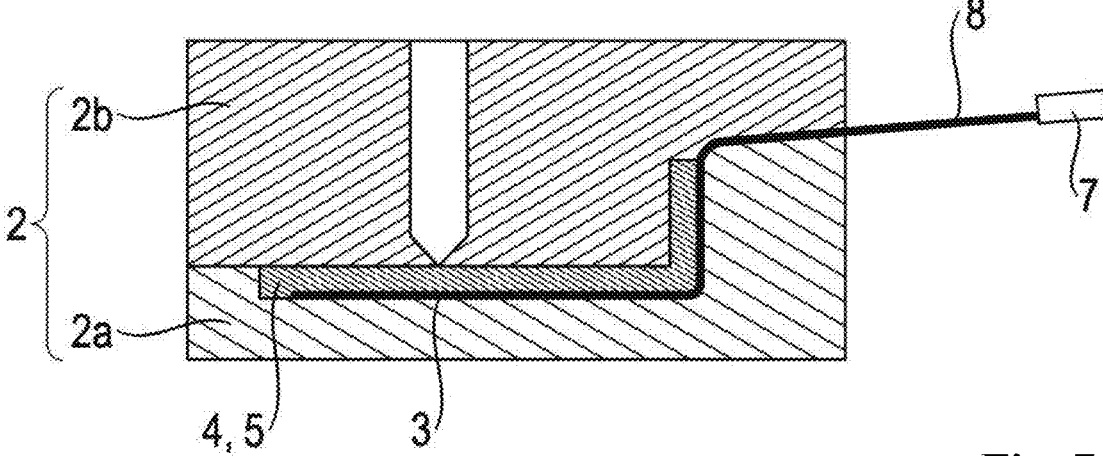
FIG. 7 shows a schematic cross-sectional view of a second method step of the manufacturing method according to the second example of the present disclosure.
Figure 8:
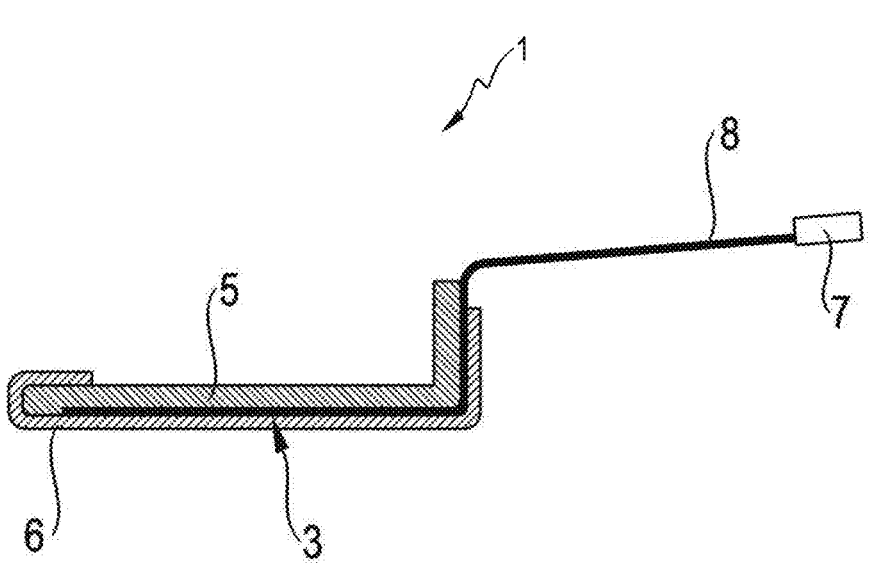
FIG. 8 shows a schematic cross-sectional view of an interior component according to a third and a fourth method step of the manufacturing method according to the second example of the present disclosure.

FIGS. 6-8 show various method steps of a manufacturing method according to a second example in chronological sequence. In the manufacturing method according to the second example, the heating element 3 differs from the heating element 3 of the first example in that the terminal plug 7 is connected with the heating element 3 via a conductor element 8. The conductor element 8, in one example, comprises one or more electrical conductors.

Analogously to the method step shown in FIG. 2, the heating element 3 is disposed in an injection mold 2. Here the heating element 3 is placed on a first injection-mold part 2*a* of the injection mold 2. With the heating element 3, a part of the conductor element 8 is placed on the first injection-mold part 2*a*. In regions in which the conductor element 8 is curved due to a curvature of the injection mold 2, the injection mold 2 can have support ribs. In the example depicted, the first injection-mold part 2*a* can in particular include a support rib in the region of the bottom right corner, in which the conductor element 8 is bent upward by 90°.

After the arranging of the heating element 3 in the injection mold 2, in particular the first injection-mold part 2*a*, a second injection-mold part 2*b* of the injection mold 2 is disposed opposite the heating element 3. The second injection mold part 2*b* comprises a nozzle for the plastic melt 4. Unlike in the first example, with the manufacturing method according to the second example, a hold-down device 9 in the second injection mold part 2*b* can be omitted.

As shown in FIG. 7, the injection mold 2, in particular the first injection-mold part 2*a* and the second injection-mold part 2*b*, form a hollow space, or a cavity. The plastic melt 4 is injected into this hollow space. The plastic melt 4 can be, for example, a heated rigid plastic 4, in particular a heated thermoplastic 4. The injecting process, in one example, comprises a single injection event, so that during the course of the injecting process, the plastic melt 4 does not cool or only cools insignificantly.

The heating element 3 and a part of the conductor element 8 are disposed in the hollow space, in particular in the cavity, during the injecting. Due to the injecting of the plastic melt 4 into the hollow space, the heating element 3 and a part of the conductor element 8 are back-injected. The terminal plug 7 and the part of the conductor element 8 that is not disposed in the hollow space remain free of the plastic melt 4. The surface of the heating element 3 that abuts against the injection-mold part 2*a* remains substantially free of the plastic melt 4. In one example, during the injecting of the plastic melt 4, the terminal plug 7 and the heating element 3 are back-injected together with the plastic melt 4. In another example, during the injecting of the plastic melt 4, the conductor element 8 and the heating element 3 are back-injected together with the plastic melt 4.

After the injecting of the plastic melt 4, the plastic melt 4 solidifies by cooling and/or by a thermal reaction. The solidified plastic melt 4 produces or forms a base body 5.

The heating element 3 is disposed on the surface of the base body 5. The heating element 3 is framed by the base body 5.

FIG. 8 shows the finished interior component 1 in a cross-sectional view. In order to finish the interior component 1, a cladding 6 has been applied after the base body 5 with the heating element 3 has been removed from the injection mold 2. In the finished interior component 1, the heating element 3 and a part of the conductor element 8 are disposed between the cladding 6 and the base body 5. The heating element 3, a part of the conductor element 8, and at least a part of the surface of the base body 5 are covered or cladded by the cladding 6.

The terminal plug 7 remains accessible via the part of the conductor element 8 that is not framed by the base body 5 and remains movable with respect to the interior component 1. This has the advantage that during the installation of the interior component 1, for example, in a vehicle, the terminal plug 7 can be moved flexibly and freely, and the installing of the interior component 1 is thereby facilitated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing of an interior component for a vehicle, comprising:
   arranging a heating element in an injection mold and the heating element including a first surface opposite a second surface and a terminal plug configured for at least one of controlling and power supply is disposed on the heating element;
   injecting a plastic melt into the injection mold in order to produce a base body on whose surface the first surface of the heating element is disposed, the injection mold including a hold-down device that is configured to hold down the terminal plug during the injecting;
   removing the base body with the heating element from the injection mold after the plastic melt has solidified; and
   applying a cladding to the second surface of the heating element and at least a part of the surface of the base body to clad at least the part of the surface of the base body and the heating element,
   wherein the terminal plug and the heating element are back-injected together with the plastic melt during the injecting.

2. The method according to claim 1, wherein the injecting the plastic melt is a single injection process.

3. The method according to claim 1, wherein before the injecting the plastic melt, the heating element is fixed in the injection mold.

4. The method according to claim 1, wherein during the injecting the plastic melt, the first surface is covered by the plastic melt and the second surface remains substantially free of the plastic melt.

5. The method according to claim 4, wherein after the applying the cladding, the second surface is facing the cladding and is in direct contact with the cladding.

6. The method according to claim 1, wherein the terminal plug and the heating element are back-injected with the plastic melt such that the terminal plug is only partially surrounded by the plastic melt.

7. The method according to claim 1, wherein the heating element is connected by a guide element with the terminal plug, and during the injecting the plastic melt, the heating element and the guide element are back-injected together with the plastic melt such that at least a part of a conductor element and the terminal plug are not surrounded by the plastic melt.

8. The method according to claim 7, wherein after the applying the cladding, the heating element and at least a part of the conductor element are disposed between the cladding and the base body.

9. The method according to claim 1, wherein the injecting the plastic melt into the injection mold in order to produce the base body on whose surface the first surface of the heating element is disposed further comprises:
   injecting the plastic melt into the injection mold such that the surface of the base body is flush with the second surface of the heating element.

10. The method according to claim 1, wherein the injecting the plastic melt into the injection mold in order to produce the base body on whose surface the first surface of the heating element is disposed further comprises:

injecting the plastic melt into the injection mold such that the surface of the base body frames the heating element and the second surface of the heating element is visible.

11. A method for manufacturing of an interior component for a vehicle, comprising:

arranging a heating element in an injection mold, the heating element including a first surface opposite a second surface and a terminal plug disposed on the heating element;

injecting a plastic melt into the injection mold in order to produce a base body having a surface, with the first surface of the heating element disposed on the surface and the second surface of the heating element framed by the surface, the injection mold including a hold-down device that is configured to hold down the terminal plug during the injecting;

removing the base body with the heating element from the injection mold after the plastic melt has solidified; and applying a cladding to the second surface of the heating element and at least a part of the surface of the base body to clad at least the part of the surface of the base body and the heating element, wherein the terminal plug and the heating element are back-injected together with the plastic melt during the injecting.

12. The method according to claim 11, wherein the injecting the plastic melt is a single injection process.

13. The method according to claim 11, wherein before the injecting the plastic melt, the heating element is fixed in the injection mold.

14. The method according to claim 11, wherein during the injecting the plastic melt, the first surface is covered by the plastic melt and the second surface remains substantially free of the plastic melt.

15. The method according to claim 11, wherein after the applying the cladding, the second surface is facing the cladding and is in direct contact with the cladding.

16. The method according to claim 11, wherein the terminal plug and the heating element are back-injected with the plastic melt such that the terminal plug is only partially surrounded by the plastic melt.

17. The method according to claim 11, wherein the heating element is connected by a guide element with the terminal plug, and during the injecting the plastic melt, the heating element and the guide element are back-injected together with the plastic melt such that at least a part of a conductor element and the terminal plug are not surrounded by the plastic melt.

18. The method according to claim 17, wherein after the applying the cladding, the heating element and at least a part of the conductor element are disposed between the cladding and the base body.

19. The method according to claim 11, wherein the injecting the plastic melt into the injection mold in order to produce the base body having the surface further comprises:

injecting the plastic melt into the injection mold such that the surface of the base body is flush with the second surface of the heating element.

\* \* \* \* \*